United States Patent
Ugur-Ozekinci et al.

(10) Patent No.: US 10,664,356 B1
(45) Date of Patent: May 26, 2020

(54) METHOD AND SYSTEM FOR ENABLING SEPARATION OF DATABASE ADMINISTRATOR AND BACKUP ADMINISTRATOR ROLES

(71) Applicant: EMC Corporation, Hopkinton, MA (US)

(72) Inventors: Yasemin Ugur-Ozekinci, Oakville (CA); Vladimir Mandic, San Jose, CA (US); Thomas Papadakis, Burlington (CA); Dorota Zak, Mississauga (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 536 days.

(21) Appl. No.: 13/905,716

(22) Filed: May 30, 2013

(51) Int. Cl.
*G06F 11/14* (2006.01)

(52) U.S. Cl.
CPC .................. *G06F 11/1464* (2013.01)

(58) Field of Classification Search
CPC .. G06F 3/065; G06F 11/1448; G06F 2201/84; G06F 3/0619; G06F 3/0652; G06F 3/0689; G06F 11/1451; G06F 11/1458; G06F 11/1464; G06F 11/1466; G06F 11/2094; G06F 11/3003; G06F 11/3055; G06F 2201/08; G06F 2201/865; G06F 3/0649; G06F 3/0685
See application file for complete search history.

(56) References Cited

U.S. PATENT DOCUMENTS

| | | | | |
|---|---|---|---|---|
| 6,618,822 | B1* | 9/2003 | Loaiza | G06F 17/30368 707/999.202 |
| 7,549,037 | B1* | 6/2009 | Kale | G06F 11/1466 711/218 |
| 7,827,145 | B1* | 11/2010 | Spertus | G06F 11/1464 707/610 |
| 8,214,376 | B1* | 7/2012 | Jordan | G06F 17/30336 707/755 |
| 8,364,648 | B1* | 1/2013 | Sim-Tang | G06F 17/30368 707/674 |
| 9,424,265 | B1* | 8/2016 | Sui | G06F 17/30129 |
| 2004/0019824 | A1* | 1/2004 | McCombs | G06F 11/1417 714/13 |
| 2006/0015544 | A1* | 1/2006 | Kodama | G06F 17/30973 |
| 2007/0185922 | A1* | 8/2007 | Kapoor | G06F 11/1469 |
| 2007/0220059 | A1* | 9/2007 | Lu | G06F 17/30368 |
| 2009/0172046 | A1* | 7/2009 | Kodama | G06F 11/1451 |
| 2013/0024423 | A1* | 1/2013 | Doshi | G06F 11/1448 707/640 |
| 2016/0004720 | A1* | 1/2016 | Tabaaloute | G06F 17/30607 707/639 |

* cited by examiner

*Primary Examiner* — Taelor Kim
(74) *Attorney, Agent, or Firm* — Dergosits & Noah LLP; Todd A. Noah

(57) ABSTRACT

Enabling separation of database administrator and backup administrator roles is described. A backup catalog and a database schema are queried to identify backup information associated with a backup file stored on a disk. A clone copy of the backup file is created. The clone copy is stored on an external destination node including an external disk and/or a tape, based on the backup information. The clone copy may be recovered from the external destination node based on the backup information and restored to a database in response to a determination that the backup file is at least one of corrupted and absent from the disk.

20 Claims, 3 Drawing Sheets

METHOD AND SYSTEM FOR ENABLING SEPARATION OF DATABASE ADMINISTRATOR AND BACKUP ADMINISTRATOR ROLES

BACKGROUND

If a software error corrupts a database, or if erroneous data updates the database, a database administrator may restore the database to a previous uncorrupted state that does not include the corrupted or erroneous data. A backup application executes a backup operation either occasionally or continuously to enable this restoration, storing a copy of each desired database state (the values of its data and these values' embedding in the database's data structures) within dedicated backup files. When the database administrator decides to return the database to a previous state, the database administrator specifies the desired previous state by identifying a desired point in time when the database was in this state, and instructs the backup application to execute a restore operation to restore a copy of the corresponding backup files for that state to the database. An additional copy that is made of the copy of the backup files and stored separately from the backup files may be referred to as a clone copy of the backup files.

A relational database management system, such as Oracle®, SQL® database, IBM® DB2® database, or any other type of relational database, typically use the relational database management system's native backup and recovery tool to store a backup file to a file system directory (sometimes called a flash recovery area) on a locally accessible disk. Then the native backup and recovery tool may create and store a clone copy of the backup file using a one-step backup process, a two-step backup process, or store a backup file directly to external backup device using a one-step backup process. In the one-step backup process, a database administrator for the relational database management system and a backup administrator for a third-party backup application together create and store the clone copy of the backup file directly to a backup device that is external to the relational database management system. The third-party backup application typically has a plugin for the relational database management system. The relational database management system sends a clone copy of the backup file directly to the plugin using a well-defined application program interface, and in turn to the external backup device. In the two-step backup process, the database administrator uses the relational database management system's native backup and recovery tool to store the backup file to a file system directory on a disk, such as a flash recovery area, without using any third-party backup application, and then requests the backup administrator to use the third-party backup application to store a clone copy as a regular file system backup of this directory to the external backup device.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
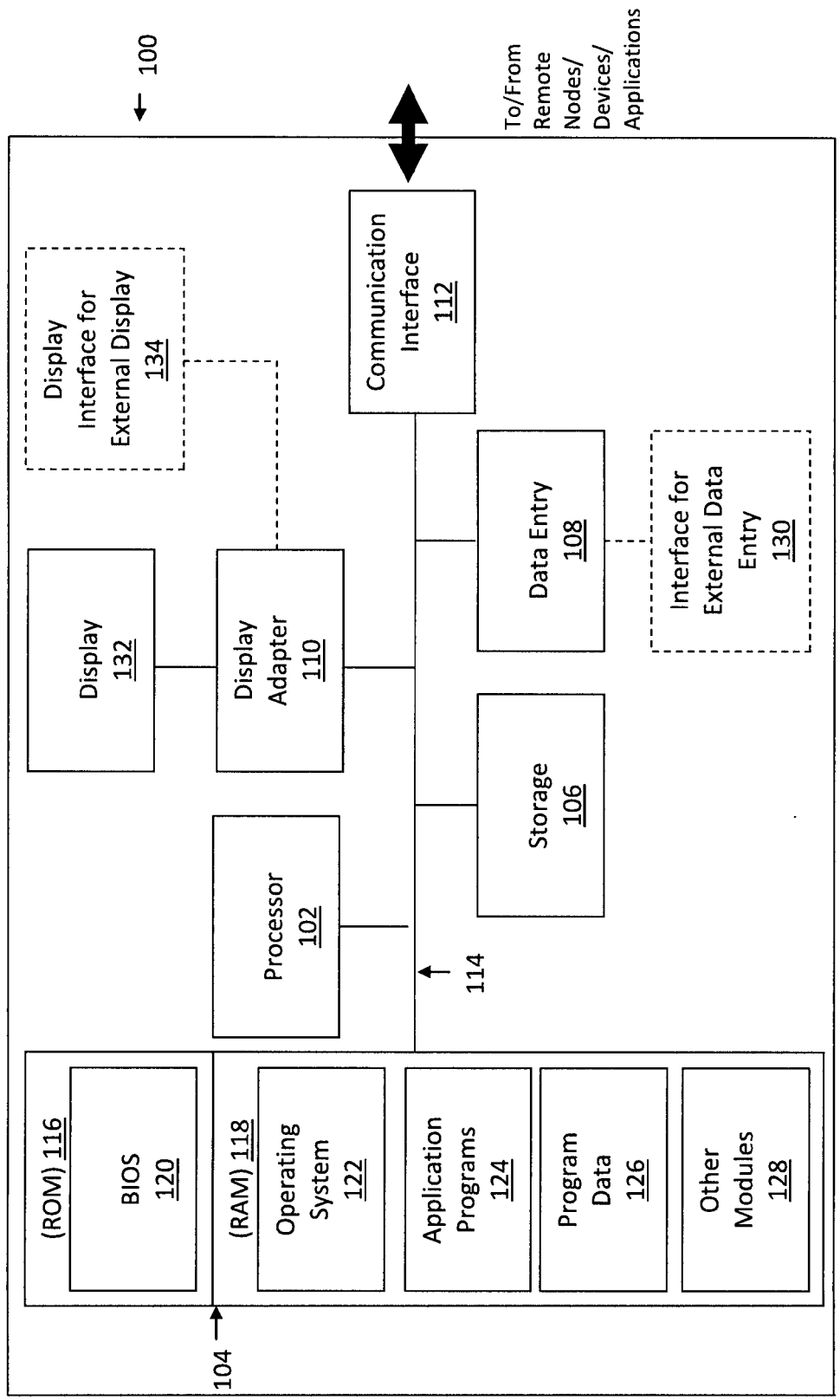
FIG. 1 is a block diagram illustrating an example hardware device in which the subject matter may be implemented.

The one-step backup process requires the administrator who is responsible for the backups and restores to know both the relational database management system and the third-party backup application in depth. For example, the administrator needs to have database credentials, to know the relational database management system, to know the relational database management system's native backup and recovery tool, and to know scripting; as well as to have some of the backup administrator level privileges and to know the third-party backup application's administration to set up external backup resources and schedule clones of backups accordingly. Generally, database administrators do not want to learn about third-party backup applications, and backup administrators do not want to learn about relational database management systems. During the recovery and restore process that follows the two-step backup process, the database administrator has to manually identify which backup files are needed to restore the corrupted database, request the backup administrator to recover the corresponding clone copies of the backup files from the external backup device for the original file system directory, and then start the relational database management system restore process. As a result, the recovery process may become convoluted and error-prone. Furthermore, the database administrator has to manually purge the backup files from the disk after the backup application creates and stores clone copies of them to the external backup device, to reclaim space on the disk for the next disk backup, archived transaction logs, etc. Additionally, the backup administrator does not know what clone copies are on the external backup device and therefore cannot report on the clone copies stored on the external backup device. The archived transaction logs may not exist in the file system directory on a disk, such as the flash recovery area, due to either space issues or archived log destinations were not set correctly. If this happens, the database might be recovered to an inconsistent state, as the clone copy of the file system directory on a disk, such as the flash recovery area, will contain the archived transaction logs copy, and as a result, a clone copy of the archived transaction logs, which may be needed to make the database consistent, is not stored on the external backup device.

Embodiments herein enable separation of database administrator and backup administrator roles and resolve the issues that come with in the two-step backup process. A database system's backup catalog and a database schema are queried to identify backup files and backup information associated with backup files stored on a disk. For example, a backup application queries a database system's backup catalog to discover a full and incremental backup copy o Human Resources database, and queries the database schema to identify backup metadata information, such as the name of database, and Human Resource data files and tablespaces, included in the full and incremental backup copy. The backup application then creates a clone copy of the backup files. For example, the backup application creates a clone copy of the identified full and incremental backup copy. The clone copy is stored on an external destination node including an external disk and/or a tape. For example, the backup application stores the clone copy on an external disk, along with the identified backup metadata information for the full and incremental backup copy. The clone copy may be recovered directly from the external destination node based on the backup information in the backup catalog, and restored to the database if the backup file is corrupted and/or deleted from the disk. For example, a backup and recovery tool restores the clone copy directly from the external disk based on the information in the catalog for the external full and incremental backup copy, and restores the clone copy to the corrupted database. The backup application enables the separation of database administrator and backup administrator roles. The database administrator can continue performing backups, without learning about the third-party backup application. The backup administrator can continue with their backup administrator tasks without learning about the relational database management system.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAM-BUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for enabling separation of database administrator and backup administrator roles.

Generally, database administrators do not want to learn about third-party backup applications, and backup administrators do not want to learn about relational database management systems. Embodiments herein enable separation of database administrator and backup administrator roles. The database administrator can continue performing backups, without learning about the third-party backup application. The backup administrator can continue with their backup administrator tasks without learning about the relational database management system.

Figure 2:
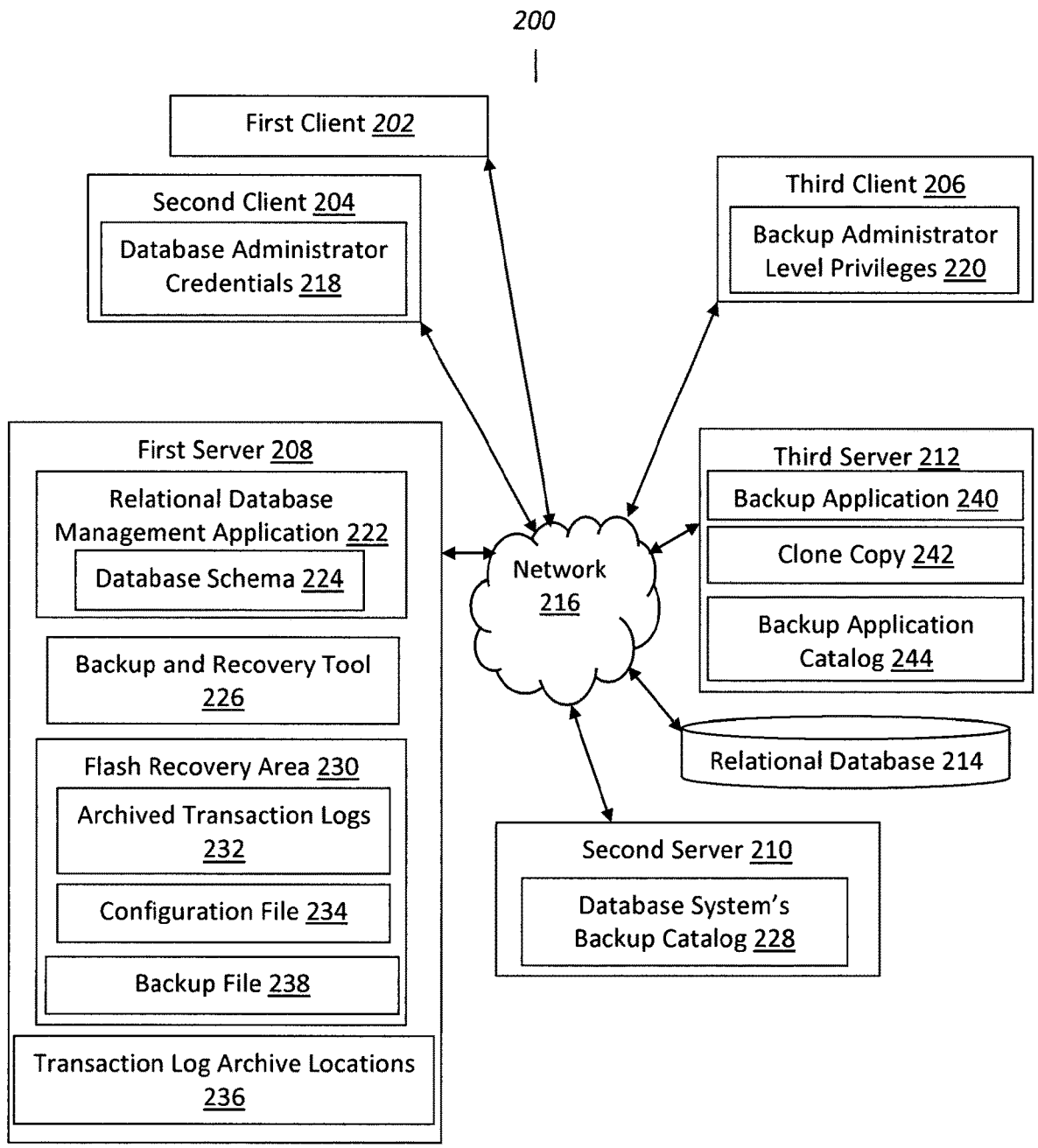
FIG. 2 illustrates a block diagram of an example system for enabling separation of database administrator and backup administrator roles, under an embodiment.

FIG. 2 illustrates a block diagram of a system that enables separation of database administrator and backup administrator roles, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202, a second client 204, and a third client 206; and a first server 208, a second server 210, and a third server 212, that are provided by a hosting company. The first server 208 is associated with a relational database 214. The clients 202-206, the servers 208-212, and the relational database 214 communicate via a network 216. Although FIG. 2 depicts the system 200 with three clients 202-206, three servers 208-212, one relational database 214, and one network 216, the system 200 may include any number of clients 202-206, servers 208-212, relational databases 214, and networks 216. The clients 202-206 and the servers 208-212 may each be substantially similar to the system 100 depicted in FIG. 1.

The first client 202 enables a user to access a relation database management system as a system user. The second client 204 includes database administrator credentials 218 that enable a user to access the relation database management system as a database administrator. The third client 206 includes backup administrator level privileges 220 that enable a user to access a third-party backup application as a backup administrator. The first server 208 includes a relational database management application 222 that executes to implement the relation database management system. The relational database management application 222 includes a database schema 224 that defines the tables, fields, relationships, views, indexes, packages, procedures, functions, queues, triggers, types, sequences, synonyms, database links, directories, and other elements of the relation database management system. The first server 208 also includes a backup and recovery tool 226 that manages backup and recovery for the relational database 214. The second server 210 includes a backup catalog 228 that records activity of the backup and recovery tool 226 for at least one relational database 214. The first server 208 also includes a flash recovery area 230 that stores files related to backup and recovery. The flash recovery area 230 may include archived transaction logs 232 that list transactions applied to the data in the relational database 214, and a configuration file 234 that specifies configuration settings for the relational database 214. The first server 208 also includes a transaction log archive locations 236 that archives transactions applied to the data in the relational database 214, and a backup file 238 that may be an image copy of data files or a proprietary format file that includes parts or all of multiple data files. The third server 212 includes a backup application 240 that creates and recovers a clone copy 242 of the backup file 238, and a backup application's catalog 244. The backup file 238 includes full database backups, incremental database backups, archived transaction log backups, and configuration file backups.

FIG. 2 depicts the system elements 222-226 and 230-238 residing completely on the first server 208 and the system elements 240-244 residing completely on the third server 212. However, the system elements 222-226 and 230-238 may reside in any combination of partially on the first server 208 and partially on other servers that are not depicted in FIG. 2. Similarly, the system elements 240-244 may reside in any combination of partially on the third server 212 and partially on other servers that are not depicted in FIG. 2.

After the database administrator uses the backup and recovery tool 226 to create the backup file 238 for the relational database 214, and store the backup file 238 on a disk associated with the second server 220, the backup application 240 queries the database system's backup catalog 228 and the database schema 224 to identify backup copies in the flash recovery area 230 and backup information associated with the backup file 238. For example, the backup application 240, such as a NetWorker® backup application, uses a SQL® query of the database system's backup catalog 228 to identify the incremental backup copy 238 of changes to Human Resources data stored in the relational database 214, and a SQL® query of the database schema 224 to identify backup information for the incremental backup copy 238. The backup application 240 may query backup catalog views to identify mapping of the backup file 238 to database objects. For example, a SQL® query identifies that the backup file 238 is associated with a backup set, which is associated with data files, which are associated with tablespaces in the relational database 214. The backup information may include the archived transaction logs 232 and/or the configuration file 234, which may be required to completely restore the relational database 214. If the archived transaction logs 232 are absent from the flash recovery area 230, the backup application 240 may identify the archived transaction logs 232 in the other transaction log archive locations 236 and create a clone copy 224 on the external backup device.

EMC Corporation's NetWorker® backup application is a suite of enterprise level data protection software that unifies and automates backup to tape, disk-based, and flash-based storage media across physical and virtual environments for granular and disaster recovery. Cross-platform support is provided for many environments, including Microsoft Windows®, Unix, and Linux platforms. A central NetWorker® server manages a data zone that contains backup clients and NetWorker® storage nodes that access the backup media. The NetWorker e management console software provides a graphic user interface for functions such as client configuration, policy settings, schedules, monitoring, reports, and daily operations for deduplicated and non-deduplicated backups. The core NetWorker® software backs up client file systems and operating system environment. Add-on database and application modules provide backup services for products such as Oracle Server. Client backup data can be sent to a remote NetWorker® storage node or stored on a locally attached device by the use of a dedicated storage node. EMC Corporation's NetWorker® modules for databases and applications supports cross platform products such as IBM DB2, Informix, Sybase, Lotus and Oracle.

The backup application 240 creates the clone copy 242 of the backup file 238, which may be a full database backup, an incremental database backup, a transaction log archive backup, and/or a configuration file copies backup. For example, the backup application 240 creates the clone copy 242 of the identified incremental backup copy 238. The clone copy 242 includes the full backup file 238, the incremental backup file 238, and may include the archived transaction log 232 and/or the configuration file 234.

The backup application 240 stores the clone copy 242 on an external destination node including an external disk and/or a tape, based on the backup information. For example, the backup application 240 stores the clone copy 242 with the identified backup information for the incremental backup copy 238 on a disk associated with the third server 212, thereby protecting the clone copy 242 of the incremental backup copy 238 even if the relational database 214 and/or the incremental backup copy 238 stored on a disk associated with the second server 210 is corrupted. The clone copy 242 may include the archived transaction logs 232 and/or the configuration file 234. The clone copy 242 may be recorded in the database system's backup catalog 228 as an external copy linked to the backup application 240. The backup application 240 may associate at least some of the backup information with the clone copy 242, wherein the backup information includes metadata associated with the backup copy 238, and store this information in its own backup catalog. For example, the backup information is metadata for the incremental backup copy 238 that enables the clone copy 242 to be identified as a clone of the incremental backup copy 238, including information such as database name, database files, that specifically enables a backup administrator to query, identify, catalog, and report on the clone copy 242 without detailed knowledge of the relational database management system.

The external destination node, such as the third server 212, may include multiple destination nodes, and the multiple destination nodes may include a disk destination node, a tape destination node, and/or a destination node that is a combination of disks and tapes. For example, the backup application 240 may store the clone copy 242 on a disk, on a tape, or partly on a disk and partly on a tape associated with the third server 212. A backup administrator may access the backup application 240 via the third client 206 to specify a priority for storing the clone copy 242 on the external destination nodes, such as storing only on disks, or storing on disks before storing on a combination of disks and tapes. Additionally, a backup administrator may use the backup application 240 to specify the options for the clone copy 242 to be encrypted, deduplicated, and/or compressed while being transmitted from a source, and the options for clone copy 242 to be decrypted and/or decompressed when stored on an external destination node. Data deduplication significantly reduces cloning time by only storing unique daily changes, while always maintaining daily clone copies of full backup files for an immediate single-step restore. The transmission of deduplicated clone copies sends only changed blocks, thereby reducing network traffic.

The database system or the backup application 240 may delete the backup file 238 from a disk due to a retention policy or space limitations on disk, and delete the backup file's record in both database system's backup catalog 228 and the backup application's catalog 244. The backup application 240 may also delete the clone copy 242 and delete its backup records from both the database system's backup catalog 228 and the backup application's catalog 244, if the clone copy 242 is expired on an external destination node due to a retention policy. For example, the backup application 240 deletes the clone copy 242 and deletes its backup records from both database system's backup catalog 228 and the backup application's catalog 244 if the clone copy 242 is absent from the disk associated with the third server 212 due to a retention policy. This deletion ensures that if the clone copy 242 is absent from the disk associated with the third server 212 because the timestamp for the clone copy 242 indicated that the clone copy 242 was expired, the backup and recovery tool 226 does not have the opportunity to use the corresponding and similarly expired backup file 238 to incorrectly restore the relational database 214. The database administrator no longer has to be concerned about purging old backup files to reclaim disk space for storing new backup files. The retention policy may specify to store a first copy onto a recovery area on the locally accessible disk for 1 month, store a clone copy on an external backup disk for 1 year, and store a secondary duplicate of the clone copy on a tape for 5 years.

The backup and recovery tool 226 may recover the clone copy 242 from the external destination node directly based on the backup catalog information, and may restore the clone copy 242 to the relational database 214 if the first backup copy 238 is corrupted and/or absent from a disk associated with the second server 210. For example, the backup and recovery tool 226 recovers the clone copy 242 from the third server 212 based on the backup catalog records for the incremental backup copy 238, and restores the recovered clone copy 242 to the corrupted relational database 214. The recovery and restoration may be based on the settings used when the backup application 240 created the clone copy 242, such as the server name that stored the clone copy 242. A database administrator may also select to execute a manual rollback to restore the relational database 214 based on a certain checkpoint selected by the database administrator.

The backup and recovery tool 226 may typically select to restore the relational database 214 from the backup file 238 stored on the disk associated with the second server 210. However, if the backup and recovery tool 226 determines that the backup file 238 stored on the disk associated with the second server 210 is corrupted or absent, the backup and recovery tool 226 recovers the clone copy 242 from the disk associated with the third server 212 based on the identified backup information for the incremental backup copy 238, and restores the clone copy 242 to the corrupted relational database 214. Even if the backup and recovery tool 226 recovers the clone copy 242 from the disk associated with the third server 212, a database administrator requesting the recovery via the second client 204 participates in a single step recovery process, as the database administrator does not have to request assistance from the backup administrator, or the separate loading of any storage medium used for long-term data retention, such as a tape storage.

The backup application 240 enables the separation of database administrator and backup administrator roles. The database administrator can continue performing backups, without learning about the backup application 240. The backup administrator can continue with their backup administrator tasks without learning about the relational database management system.

Figure 3:
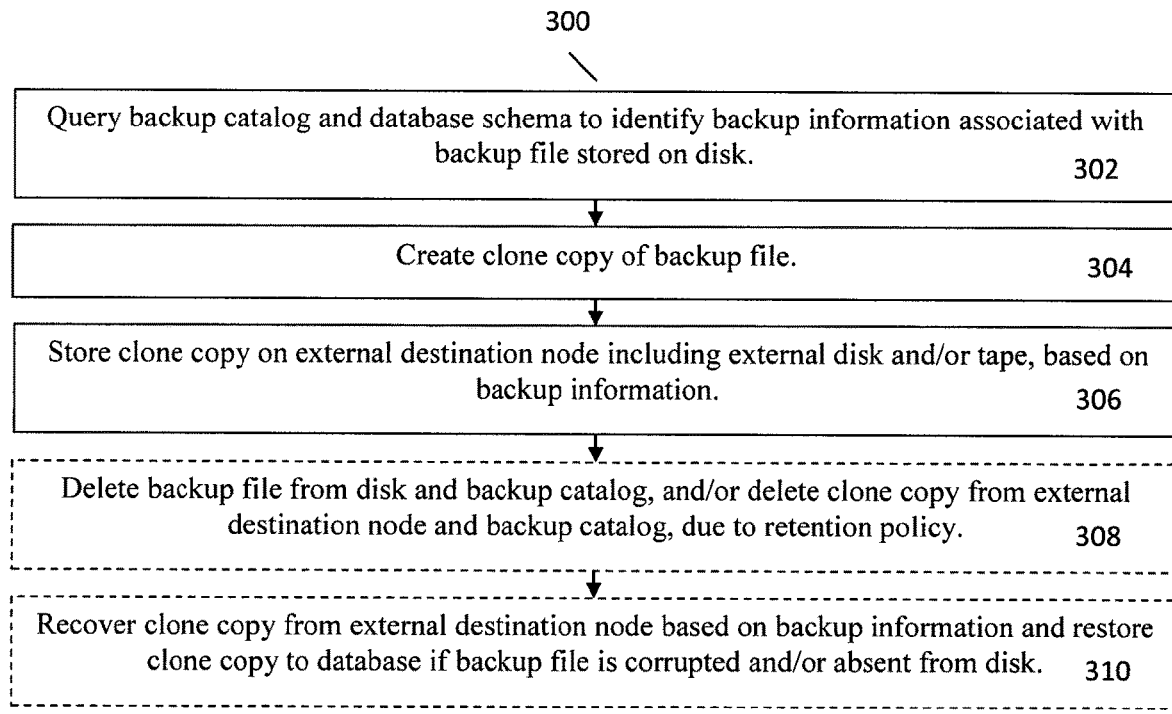
FIG. 3 is a flowchart that illustrates a method of enabling separation of database administrator and backup administrator roles, under an embodiment.

FIG. 3 is a flowchart that illustrates a method of enabling separation of database administrator and backup administrator roles. Flowchart 300 illustrates method acts illustrated as flowchart blocks for certain steps involved in and/or between the clients 202-206 and/or the servers 208-212 of FIG. 2.

A backup catalog and a database schema are queried to identify backup information associated with a backup file stored on a disk, act 302. For example, the backup application 240 queries the database system's backup catalog 228 to identify the incremental backup copy 238 of changes to Human Resources data stored in the relational database 214, and queries the database schema 224 to identify backup information for the incremental backup copy 238.

A clone copy of the backup file is created, act 304. For example, the backup application 240 creates the clone copy 242 of the identified incremental backup copy 238.

The clone copy is stored on an external destination node including an external disk and/or a tape, based on the backup information, act 306. For example, the backup application 240 stores the clone copy 240 with the identified backup information for the incremental backup copy 238 on a disk associated with the third server 212. After the backup application 240 stores the clone copy 240, the backup application 240 catalogs the clone copy 240 in database system's backup catalog 228 as an external copy, links to the backup application 240, and catalogs the clone copy 240 in the backup application's catalog 244 including backup metadata information.

A backup file and/or a clone copy is optionally deleted from a disk and a backup catalog due to a retention policy, act 308. For example, the backup application 240 deletes the incremental backup copy 238 record from the flash recovery area 230 on the first server 208 and from the database system's backup catalog 228 on the second server 210 due to a retention policy. The backup application 240 enables automatic deletion of backup files from the flash recovery area 230 after the clone copy 240 is created. The backup application 240 also flags and deletes catalog entries from both catalogs 228 and 244 when a clone is expired on the external node.

The clone copy is optionally recovered from the external destination node based on the backup information and optionally restored to the database if the backup file is corrupted and/or absent from the disk, act 310. For example, the backup and recovery tool 226 recovers the clone copy 242 from the disk associated with the third server 212 based on the identified backup information for the incremental backup copy 238, and restores the clone copy 242 to the corrupted relational database 214.

Although FIG. 3 depicts the acts 302-310 occurring in a specific order, the acts 302-310 may occur in another order. Executing the acts in flowchart 300 enables the separation of database administrator and backup administrator roles. The database administrator can continue performing backups, without learning about the backup application 240. The backup administrator can continue with their backup administrator tasks without learning about the relational database management system.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for enabling separation of database administrator and backup administrator roles, the system comprising:
    a processor-based backup application executed on a computer and configured to:
        identify a backup file of a plurality of backup files stored on a database by querying a database system backup catalog associated with the database;
        query a database schema to identify backup information associated with the backup file stored on the database based on identifying the backup file, the database schema defining elements of the database, the backup information including at least one of an archived transaction log and a configuration file used for restoring the database;
        create a clone copy of the identified backup file using the associated identified backup information;
        store the clone copy of the identified backup file and the associated identified backup information on an external destination node comprising at least one of an external disk and a tape, based on the backup information; and
        catalog the clone copy and the associated identified backup information both in the database system backup catalog as an external copy of the identified backup file and in a backup application backup catalog associated with the backup application.

2. The system of claim 1, wherein querying the database system backup catalog and the database schema comprises querying database system backup catalog views to identify mapping of the backup file to database objects.

3. The system of claim 1, wherein the backup information comprises metadata information about the backup file, a database name, a list of archived redo log names and their system change numbers, configuration files, a list of data file names and tablespaces and their system change numbers, and wherein the clone copy further comprises backup of one or more full or incremental database backups, an archived transaction log backup, and a configuration file backup.

4. The system of claim 3, wherein the processor-based application is further configured to identify the archived transaction log in other transaction log archive locations in response to a determination that the archive transaction log is absent from a flash recovery area.

5. The system of claim 1, wherein storing the clone copy on the external destination node comprises associating at least some of the backup information with the clone copy, and wherein the backup information comprises metadata associated with the backup file.

6. The system of claim 1, wherein the processor-based application is further configured to delete at least one of (1) the backup file from the disk and the database system backup catalog and (2) the clone copy from the external destination node and the backup application backup catalog, the deletion being based on a retention policy.

7. The system of claim 1, wherein the processor-based application is further configured to recover the clone copy from the external destination node based on the backup information and restore the clone copy to a database in response to a determination that the backup file is at least one of a corrupted backup file and an absent backup file.

8. A computer-implemented method for enabling separation of database administrator and backup administrator roles, the method comprising:
    identifying, by a backup application, a backup file of a plurality of backup files stored on a database by querying a database system backup catalog associated with the database;
    querying, by the backup application, a database schema to identify backup information associated with the backup file stored on the database based on identifying the backup file, the database schema defining elements of the database, the backup information including at least one of an archived transaction log and a configuration file used for restoring the database;
    creating, by the backup application, a clone copy of the identified backup file using the associated identified backup information;
    storing, by the backup application, the clone copy of the identified backup file and the associated identified backup information on an external destination node comprising at least one of an external disk and a tape, based on the backup information; and
    cataloging, by the backup application, the clone copy and the associated identified backup information both in the database system backup catalog as an external copy of the identified backup file and in a backup application backup catalog associated with the backup application.

9. The method of claim 8, wherein querying the database system backup catalog and the database schema comprises querying database system backup catalog views to identify mapping of the backup file to database objects.

10. The method of claim 8, wherein the backup information comprises metadata information about the backup file, a database name, a list of archived redo log names and their system change numbers, configuration files, a list of data file names and tablespaces and their system change numbers, and wherein the clone copy further comprises backup of one or more full or incremental database backups, an archived transaction log backup, and a configuration file backup.

11. The method of claim 10, wherein the method further comprises identifying the archived transaction log in other transaction log archive locations in response to a determination that the archive transaction log is absent from a flash recovery area.

12. The method of claim 8, wherein storing the clone copy on the external destination node comprises associating at least some of the backup information with the clone copy, and wherein the backup information comprises metadata associated with the backup file.

13. The method of claim 8, wherein the method further comprises deleting at least one of (1) the backup file from the disk and the database system backup catalog and (2) the clone copy from the external destination node and the backup application backup catalog, the deletion being based on a retention policy.

14. The method of claim 8, wherein the method further comprises recovering the clone copy from the external destination node based on the backup information and restoring the clone copy to a database in response to a determination that the backup file is at least one of a corrupted backup file and an absent backup file from the disk.

15. A computer program product, comprising a non-transitory computer-readable medium having a computer-readable program code embodied therein, the computer-readable program code adapted to be executed by one or more processors to implement a method for enabling separation of database administrator and backup administrator roles, the method comprising:

identifying, by a backup application, a backup file of a plurality of backup files stored on a database by querying a database system backup catalog associated with the database;

querying, by the backup application, a database schema to identify backup information associated with the backup file stored on the database based on identifying the backup file, the database schema defining elements of the database, the backup information including at least one of an archived transaction log and a configuration file used for restoring the database;

creating, by the backup application, a clone copy of the identified backup file using the associated identified backup information;

storing, by the backup application, the clone copy of the identified backup file and the associated identified backup information on an external destination node comprising at least one of an external disk and a tape, based on the backup information; and cataloging, by the backup application, the clone copy and the associated identified backup information both in the database system backup catalog as an external copy of the identified backup file and in a backup application backup catalog associated with the backup application.

16. The computer program product of claim 15, wherein querying the database system backup catalog and the database schema comprises querying database system backup catalog views to identify mapping of the backup file to database objects.

17. The computer program product of claim 15, wherein the backup information comprises metadata information about the backup file, a database name, a list of archived redo log names and their system change numbers, configuration files, a list of data file names and tablespaces and their system change numbers, and wherein the clone copy further comprises backup of one or more full or incremental database backups, an archived transaction log backup, and a configuration file backup.

18. The computer program product of claim 15, wherein storing the clone copy on the external destination node comprises associating at least some of the backup information with the clone copy, and wherein the backup information comprises metadata associated with the backup file.

19. The computer program product of claim 15, wherein the method further comprises deleting at least one of (1) the backup file from the disk and the database system backup catalog and (2) the clone copy from the external destination node and the backup application backup catalog, the deletion being based on a retention policy.

20. The computer program product of claim 15, wherein the method further comprises recovering the clone copy from the external destination node based on the backup information and restoring the clone copy to a database in response to a determination that the backup file is at least one of a corrupted backup file and an absent backup file.

* * * * *